United States Patent
Le-Mercier et al.

(10) Patent No.: US 8,092,713 B2
(45) Date of Patent: Jan. 10, 2012

(54) METHOD FOR MARKING A MATERIAL AND RESULTING MARKED MATERIAL

(75) Inventors: Thierry Le-Mercier, Paris (FR); Claude Ceintrey, Marly-le-Roi (FR)

(73) Assignee: Rhodia Chimie, Aubervilliers (FR)

( * ) Notice: Subject to any disclaimer, the term of this patent is extended or adjusted under 35 U.S.C. 154(b) by 642 days.

(21) Appl. No.: 11/632,436

(22) PCT Filed: Jul. 11, 2005

(86) PCT No.: PCT/FR2005/001787
§ 371 (c)(1),
(2), (4) Date: Sep. 6, 2007

(87) PCT Pub. No.: WO2006/016058
PCT Pub. Date: Feb. 16, 2006

(65) Prior Publication Data
US 2007/0295116 A1    Dec. 27, 2007

(30) Foreign Application Priority Data

Jul. 16, 2004   (FR) .................................... 04 07911

(51) Int. Cl.
| G07D 7/12 | (2006.01) |
| C09K 11/08 | (2006.01) |
| C09K 11/73 | (2006.01) |
| C09K 11/56 | (2006.01) |
| C09K 11/62 | (2006.01) |

(52) U.S. Cl. ...... 252/301.36; 252/301.4 S; 252/301.4 R; 252/301.4 H; 252/301.4 P; 252/301.4 F; 106/31.64; 106/31.32; 428/690; 283/92; 283/901; 250/559.59; 250/559.44; 250/484.4; 250/486.1

(58) Field of Classification Search ............. 252/301.36, 252/301.4 R, 301.4 F, 301.4 S, 301.4 P, 301.4 H; 106/31.64, 31.32; 428/690; 283/92, 901; 250/559.59, 559.44, 484.4, 486.1
See application file for complete search history.

(56) References Cited

U.S. PATENT DOCUMENTS

| 5,159,180 | A | * | 10/1992 | Feiler ............................ 235/375 |
| 5,340,556 | A | * | 8/1994 | Collin et al. ................... 423/263 |
| 5,562,889 | A | * | 10/1996 | Collin et al. ................... 423/263 |
| 5,746,944 | A | * | 5/1998 | Braconnier ............. 252/301.4 P |
| 5,770,110 | A |   | 6/1998 | Schrell et al. |
| 6,165,609 | A | * | 12/2000 | Curatolo ........................ 428/343 |
| 6,199,044 | B1 | * | 3/2001 | Ackley et al. ................ 704/275 |
| 7,344,895 | B2 | * | 3/2008 | Kohler et al. ................. 436/523 |
| 7,536,834 | B2 | * | 5/2009 | Blanc et al. ..................... 52/247 |
| 2002/0076550 | A1 |   | 6/2002 | Kohla et al. |
| 2003/0032192 | A1 | * | 2/2003 | Haubold et al. ................ 436/56 |

(Continued)

FOREIGN PATENT DOCUMENTS
EP    0 498 689 A1    8/1992
(Continued)

*Primary Examiner* — Carol M Koslow
(74) *Attorney, Agent, or Firm* — Buchanan Ingersoll & Rooney, P.C.

(57) ABSTRACT

The invention concerns a method for marking a material characterized in that it consists in incorporating into the material: either a phosphor capable of producing, following excitation, two light emissions whereof the respective wavelengths and the emission decay times are different, or several phosphors capable of producing, following excitation, a light emission whereof the wavelength and the emission decay time are different from the wavelength and emission decay time of the other or other phosphors. The material can in particular be of the paper, board, paint, textile, ink, glass or macromolecular material type.

7 Claims, 1 Drawing Sheet

U.S. PATENT DOCUMENTS

Figure 1:
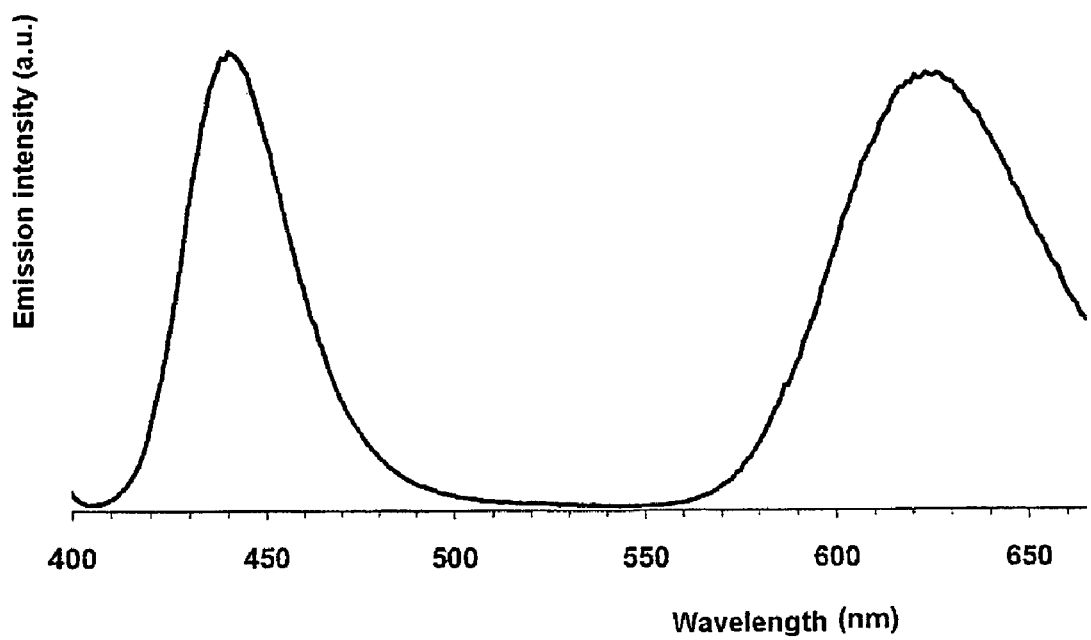

2004/0031931 A1 * 2/2004 Muller et al. .............. 250/458.1
2005/0068395 A1 * 3/2005 Haubold et al. .............. 347/100

FOREIGN PATENT DOCUMENTS

| | | | |
|---|---|---|---|
| EP | 581621 | * | 2/1994 |
| JP | 09020887 A | | 1/1997 |
| JP | 10251570 A | | 9/1998 |
| SU | 458056 | * | 1/1795 |
| WO | WO 03/052025 | * | 6/2003 |
| WO | WO 03/009661 | * | 10/2003 |
| WO | WO2004/044090 | * | 5/2004 |
| WO | WO2004/058914 | * | 7/2004 |

* cited by examiner

METHOD FOR MARKING A MATERIAL AND RESULTING MARKED MATERIAL

This application is an application under 35 U.S.C. Section 371 of International Application Number PCT/FR2005/001787 filed on Jul. 11, 2005.

The present invention relates to a method of marking a material and to a material thus marked.

There is a great need for various materials to be reliably and assuredly marked or authenticated, for example fiduciary documents, especially so as to detect any counterfeiting. Many techniques exist for this purpose. More particularly, methods may be mentioned that consist in incorporating, into the material intended to be marked, luminescent substances that can be excited and can emit in one or more parts of the visible or invisible spectrum. However, these methods have to be frequently renewed in order to prevent them from becoming ineffective.

The object of the invention is to provide a new method.

For this purpose, the method of the invention, for marking a material, is characterized by the incorporation into the material of:

either at least one phosphor capable of producing, after excitation, two light emissions, the respective wavelengths and the decay times of the emission being different;

or several phosphors each capable of producing, after excitation, a light emission, the wavelength and the decay time of the emission being different than the wavelength and the decay time of the emission of the other phosphor(s).

The invention also relates to a material of the paper, board, paint, textiles, ink, glass or macromolecular material, which is characterized in that it comprises:

either at least one phosphor capable of producing, after excitation, two light emissions, the respective wavelengths and the decay times of the emission being different;

or several phosphors each capable of producing, after excitation, a light emission, the wavelength and the decay time of the emission being different than the wavelength and the decay time of the emission of the other phosphor(s).

Finally, the invention relates to a method for authenticating a material, which is characterized in that the material is subjected to an excitation and it is observed if the material produces at least two light emissions, the respective wavelengths and decay times of the emission being different.

Other features, details and advantages of the invention will become more fully apparent on reading the following description and from the appended drawing in which:

the single FIGURE is a graph showing the emission spectrum of a phosphor according to the invention for an excitation wavelength of 370 nm.

In the rest of the description, the expression "rare earths or lanthanides" is understood to mean the elements of the group formed by yttrium and the elements of the Periodic Table with atomic numbers between 57 and 71 inclusive.

Also in the rest of the description, it should be pointed out that, unless otherwise indicated, in the ranges of values given, the values at the limits are included.

The method of the invention may be implemented according to two embodiments whereby a phosphor or a combination of a plurality, i.e. two or more, phosphors is used. The first embodiment with a single phosphor is the preferred embodiment as it is the simpler.

The phosphor of the first embodiment is preferably used alone and, as a consequence, it must first of all have the property of emitting, after excitation, light in two different wavelengths $\lambda_1$ and $\lambda_2$. The nature of the excitation may vary—it may be radiation with a wavelength in the visible spectrum or the invisible spectrum. This may more particularly be UV radiation.

The other property of the phosphor is that the respective decay times of the emission for each of the emission wavelengths are different. Thus, if a decay time $\tau_1$ corresponds to the wavelength $\lambda_1$ and a decay time $\tau_2$ corresponds to the wavelength $\lambda_2$, then $\tau_1 \neq \tau_2$.

The term "decay time" is understood, as is well known in the technical field of the present invention, to mean the constant $\tau$ in the formula:

$$I(t)=I_0 e^{-t/\tau}$$

in which t denotes time, I denotes the emission intensity at time t and $I_0$ denotes the emission intensity at t=0.

As phosphors having such properties, mention may especially be made of a first family (1) formed by barium magnesium silicates, in particular those of formula:

$$Ba_{3(1-x)}Eu_{3x}Mg_{1-y}Mn_y Si_2 O_8 \quad (1\text{-}1)$$

in which $0 < x \leq 0.3$ and $0 < y \leq 0.3$.

When these phosphors are subjected to a UV or near UV (UVA) excitation, that is to say radiation in a wavelength range lying between about 250 nm and about 370 nm or between 370 nm and 420 nm, they have the property of emitting in the red and also in the blue, that is to say in a wavelength range between 400 nm and 500 nm in the case of blue and between 550 nm and 700 nm in the case of red, with a good yield.

More particularly, the phosphors may satisfy the aforementioned formula (1-1) in which $0.0001 \leq x \leq 0.25$ and $0.0001 \leq y \leq 0.25$.

Even more particularly, the phosphors may satisfy the aforementioned formula (1-1) in which $0.01 \leq x \leq 0.25$ and $0.01 \leq y \leq 0.25$.

It may be noted that it is advantageous to have a europium concentration in the phosphor of at least 0.01% in order to obtain an emission of better intensity. It is also advantageous to have a europium and manganese concentration of at most 25% so as to minimize the annoying phenomenon of self-extinction. The percentages indicated above correspond to the degrees of molar substitution of the $Eu^{2+}$ and $Mn^{2+}$ dopant ions, respectively, with the $Ba^{2+}$ and $Mg^{2+}$ ions (substituent/[substituent+substituted element] molar ratio).

According to yet another embodiment, the phosphor of formula (1-1) is satisfied with the following x and y values: $0.01 \leq x \leq 0.03$ and $0.04 \leq y \leq 0.06$.

For these x and y values, the emission intensity is the highest.

In the same phosphor family (1), mention may also be made, as phosphors that can be used for the present invention, of those of formulae:

$$BaMg_2Si_2O_7{:}Eu,Mn \quad (1\text{-}2)$$

$$Ba_2MgSi_2O_7{:}Eu,Mn \quad (1\text{-}3)$$

in which the europium and the manganese are, as previously, present as substitutes for the barium and magnesium and in the same quantities as those described above in the case of the products of formula (1-1). As an example, the product of formula (1-2) emits in the red at around 690 nm and in the blue at around 400 nm.

Finally, in the compounds of this first family, at least one of the elements barium, magnesium and silicon may be partially substituted with other supplementary elements in addition to those described above. Thus, the barium may be partly substituted with calcium and/or with strontium in a proportion that may range up to about 30%, this proportion being expressed by the substituent/(substituent+barium) atomic ratio. The magnesium may be partly substituted with zinc in a proportion that may range up to about 30%, this proportion also being expressed by the Zn/(Zn+Mg) atomic ratio. Finally, the silicon may be partly substituted with germanium, aluminum and/or phosphorus in a proportion that may range up to about 10%, this proportion being expressed by the substituent/(substituent+silicon) atomic ratio.

As another family of phosphors that can be used in the case of the first embodiment of the invention (the embodiment with a single phosphor), mention may also be made of family (2) comprising barium magnesium aluminates and especially those of the following formulae:

$$BaMgAl_{10}O_{17} \quad (2\text{-}1)$$

$$BaMg_2Al_{16}O_{27} \quad (2\text{-}2)$$

$$BaMgAl_{14}O_{23} \quad (2\text{-}3)$$

in which the barium and the magnesium are partly substituted with europium and manganese respectively and in proportions which may especially be between 0.01 and 25%, these substituent element/substituted element proportions being expressed as above. This proportion may thus particularly be around 10%. As an example, the products of formulae (2-1) to (2-3) emit in the blue at approximately 450 nm and in the green at approximately 505 nm.

The phosphors of families (1) and (2) are known products that can be generally prepared by a high-temperature solid-state reaction of the oxides of the required metals or of organic or mineral compounds capable of forming these oxides by heating, such as carbonates, oxalates, hydroxides, acetates, nitrates and borates of said metals.

They may also be prepared by coprecipitation from solutions of the precursors of the desired oxides, for example in aqueous medium.

It is also possible to use, as single phosphor, a phosphor of formula (3), namely LnPO$_4$, in which Ln denotes a mixture of lanthanides, such as a Ce,Tb mixture, and especially phosphors of formulae (La, Ce,Tb)PO$_4$, (La, Ce,Dy)PO$_4$ and (La, Ce,Nd)PO$_4$. More particularly, mention may also be made of a phosphor of formula La$_x$Ce$_y$Tb$_{(1-x-y)}$PO$_4$ in which $0.4 \leq x \leq 0.6$ and $x+y>0.8$. Such a phosphor is described for example in patent applications EP-A-498 689 and EP-A-581 621. Because of the presence of lanthanum, this phosphor emits in the ultraviolet with a decay time of 10 ns and, owing to the presence of terbium, it also emits in the green with a decay time of 1 ms.

Again as a single phosphor, it is also possible to use alkaline-earth metal pyrophosphates of formula (4), namely M$_2$P$_2$O$_7$:Eu,Mn, in which M denotes at least one alkaline-earth metal (for example Sr, Mg, Ca or Ba), the europium and manganese both being present as dopants, substituting for the element M, as in the phosphors described above and in the same proportions. Thus, SrP$_2$O$_7$:Eu,Mn may be mentioned, which produces a blue emission at 425 nm and a red-orange emission at 590 nm.

It is also possible to use alkaline-earth metal ortho-phosphates of formula (5), namely M$_3$(PO$_4$)$_2$:Eu,Mn, in which M denotes at least one alkaline-earth metal (for example Sr, Mg, Ca, Ba), the europium and manganese both being present as dopants, substituting for the element M, as in the phosphors described above and in the same proportions, and also halophosphates of formula (6) namely Ca$_5$(PO$_4$)$_3$X:Eu,Mn, in which the calcium may optionally be substituted with at least one alkaline-earth metal and X is a halogen, such as especially chlorine, the europium and manganese being dopants as described above and in the same proportions. As an example, mention may be made of Ca$_5$(PO$_4$)$_3$Cl:Eu,Mn, which produces a blue emission at 450 nm and a red-orange emission at 590 nm.

It is also possible to use as single phosphor alkaline-earth metal thiogallates of formula (7), namely MGa$_2$S$_4$:Eu,Mn, in which M denotes at least one alkaline-earth metal (for example Sr, Mg or Ba), the europium and manganese both being dopants as described above and in the same proportions.

The second embodiment of the invention consists in using two or more phosphors. In this case, the first phosphor must be capable, after excitation, of emitting light of wavelength $\lambda'_1$ to which an emission decay time $\tau'_1$ corresponds. Moreover, the other phosphor must be capable, after excitation, of emitting light of wavelength $\lambda'_2$, to which an emission decay time $\tau'_2$ corresponds, with the requirement that $\tau'_1 \neq \tau'_2$. What was mentioned above regarding the nature of the excitation also applies here.

It is possible to use any phosphor chosen from the families of sulfides, selenides, sulfoselenides, oxysulphides, borates, aluminates, gallates, silicates, germanates, phosphates, halophosphates, oxides, arsenates, vanadates, niobates, tantalates, sulfates, tungstates, molybdates, alkaline metal halides and other halides or nitrides.

Given below, as examples, is a list of phosphors that may be used (the element A denotes a substituent or dopant element and Ln denotes a lanthanide):
BaFCl:Eu; BaFCl:Sm; BaFBr:Eu; BaFCl$_{0.5}$Br$_{0.5}$:Sm; BaY$_2$F$_8$:A (A=Pr, Tm, Er, Ce): BaSi$_2$O$_5$:Pb; BaMg$_2$Al$_{16}$O$_{27}$: Eu; BaMgAl$_2$O$_3$:Eu; Ba$_2$P$_2$O$_7$:Ti; (Ba,Zn,Mg)$_3$Si$_2$O$_7$:Pb; Ce$_{0.65}$Tb$_{0.35}$MgAl$_{11}$O$_{19}$:Ce,Tb; 3.5MgO.0.5MgF$_2$.GeO$_2$: Mn; MgWO$_4$:Pb; BaSiO$_4$:Eu; Zn$_2$SiO$_4$:Mn; ZnO:Zn; Zn$_3$(PO$_4$)$_2$:Mn; ZnS:A (A=Ag, Al, Cu, Mn, Ln, it being possible for Ln especially to be Tb or Eu), ZnS:TbF$_3$; ZnS:EuF$_3$; (Zn,Cd)S:A (A=Cu, Al, Ag, Ni); CaS:A (A=lanthanides, Bi); (Ca,Sr)S:Bi; CaWO$_4$:Pb; CaWO$_4$:Sm; CaSO$_4$:A (A=Mn, lanthanides); 3Ca$_3$(PO$_4$)$_2$.CaF$_2$.CaCl$_2$:Eu; A$_3$(PO$_4$)$_2$ACl$_2$:Eu (A=Sr, Ca, Ba); (Sr,Mg)$_2$P$_2$O$_7$:Eu; SrS:Ce, SrS:Sm, Ce; SrS:Sm; SrS:Eu; SrS:Eu,Sm; SrS:Cu,Ag; Sr$_2$P$_2$O$_7$:Sn; Sr$_2$P$_2$O$_7$:Eu; Sr$_4$Al$_{14}$O$_{25}$:Eu; SrGa$_2$S$_4$:A (A=lanthanides, Pb); SrGa$_2$S$_4$:Pb; Sr$_3$Gd$_2$Si$_6$O$_{18}$:Pb,Mn; YF$_3$:Yb,Er; YF$_3$:Ln; YLiF$_4$:Ln; Y$_3$Al$_5$O$_{12}$:Ln; YAl$_3$(BO$_4$)$_3$:Nd,Yb; (Y,Ga)BO$_3$: Eu; (Y,Gd)BO$_3$:Eu, Y$_3$(Al,Ga)$_5$O$_{12}$:Tb, Y$_2$SiO$_5$:Ln, it being possible for Ln to be more particularly Eu; Y$_2$O$_3$:Ln, it being possible for Ln to be more particularly Eu or Tb; Y$_2$O$_2$S:Ln, it being possible for Ln to be more particularly Eu; YVO$_4$:A (A=lanthanides, especially Eu, Sm, Dy, or A=In); Y(P,V)O$_4$: Eu; YTaO4:Nb; YAlO3:A (A=Pr, Tm, Er, Ce); YOCl:Yb,Er, LuVO$_4$:Eu; GdVO$_4$:Eu; Gd$_2$O$_2$S:Tb; GdMgB$_5$O$_{10}$:Ce,Tb; LaOBr:Tb; La$_2$O$_2$S:Tb; LaF$_3$:Nd,Ce; BaYb$_2$F$_8$:Eu; NaYF$_4$: Yb,Er, NaGdF$_4$:Yb,Er; NaLaF$_4$:Yb,Er; LaF$_3$:Yb,Er,Tm; BaYF$_5$:Yb,Er; Ga$_2$O$_3$:Dy; GaN:A (A=Pr, Eu, Er, Tm); LiCaAlF$_6$:Ce; LiSrAlF$_6$:Ce; LiLuF$_4$:A (A=Pr, Tm, Er, Ce); Li$_2$B$_4$O$_7$:Mn; SiO$_x$:Er,Al (0<x<2). Mention may also be made of LaPO$_4$:Eu, LaPO$_4$:Ce and SiO$_2$:Dy.

The first embodiment described above is the most advantageous in so far as it involves only a single phosphor but it goes without saying that it would not be outside the scope of the present invention if a combination of several phosphors which had, however, the property of each emitting in two different wavelengths with different decay times, were to be used. Such an implementation is more complex, but it is not excluded, for example for more sophisticated marking methods.

It may also be envisioned, still remaining within the scope of the invention, to use a first phosphor capable of emitting in two different wavelengths (a phosphor of the type of those described in respect of the first embodiment) with a second phosphor (of the type of those described in respect of the second embodiment) which emits only in a single wavelength and is capable, after excitation, of emitting light, the wavelength and decay time of the emission being different than the wavelengths and the decay times of the emissions of the first phosphor. This embodiment applies particularly to the case in which the first phosphor produces two emissions, but the intensity of one of them is particularly more intense than that of the other, for example in an intensity ratio of at least 5, more particularly at least 10. This embodiment may be advantageous when it is desired to favor the emission of a given color, such as red, and this may be obtained for example with products of formula (1-1) that are highly doped with manganese and europium.

For the two embodiments described above, the difference between the decay times of the excited states may vary over a wide range, but this is not critical. However, this difference must be large enough to be able to be detected by known systems, preferably systems that are not too costly or too sophisticated to use. To give an example, the phosphors may be chosen in such a way that the various emission decay times are in a $\tau_1/\tau_2$ or $\tau'_1/\tau'_2$ ratio of generally at most $10^{-1}$, preferably at most $10^{-3}$ and even more preferably at most $10^{-5}$. For example, this ratio may be between $10^{-6}$ and $10^{-3}$, more particularly between $10^{-6}$ and $10^{-5}$.

Furthermore, the difference between the emitted wavelengths, for example $\lambda_1-\lambda_2$ or $\lambda'_1-\lambda'_2$, may be more particularly at least 50 nm and even more particularly at least 100 nm.

In addition, and again in respect of the two embodiments of the invention, it is preferable to use one or more phosphors that emit in the visible and that emit in different colors since, in this case, verification or authentication according to the method of the invention may be implemented with the naked eye.

The method of the invention is intended for marking or authenticating any material for which it may be useful or necessary to know the origin, validity or authenticity. Thus, the nature of the material may vary very greatly. In the rest of the description relating to the various materials that can be marked by the method of the invention, it will be convenient to use the term "phosphor" in the singular, it being understood that the description applies just as well to the two embodiments described above, that is to say to the use of a single phosphor or a combination of several phosphors. Of course, apart from the marking method described above, the invention relates, as such, to the material, which will now be described below.

The invention applies most particularly to a solid material. Thus, it may be a paper or a board. In this case, the phosphor may be incorporated into the fibers of the paper or board. It is also possible to use a coating method for incorporating the phosphor in a binder transparent to the excitation radiation by which is deposited by coating it onto part or all of the surface of the sheets of paper or board that are desired to be marked.

The material may be a paint—the term "paint" is understood here in the broad sense and thus applies to formulations or compositions usually covered by this term in the technical field of paints. Hence stains and varnishes are included, and compositions based on emulsion resins of the alkyd, acrylic or phenolic type may be mentioned as examples.

The material may also be a textile. By this is meant any natural or synthetic textile material in woven, nonwoven or knitted form. The fibers of these materials may especially consist entirely of or be based on keratin, cotton, flax, wool, viscose, rayon, hemp, silk, polypropylene, polyethylene, polyester, polyurethane, polyamide, cellulose acetate or a mixture of these.

The material may also be an ink, especially a printing ink.

The material may also be a macromolecular material. This may be of various types: elastomeric, thermoplastic, thermosetting. In this case, the phosphor may be incorporated into the macromolecular material by mixing it into the material in molten form and possibly subjecting the mixture to a high shear force, for example in a twin-screw extruder, so as to produce a good dispersion. Another method consists in mixing the phosphor to be incorporated into the monomers in the polymerization medium and then in carrying out the polymerization.

Finally, the material may be a glass.

The invention may apply most particularly to the marking of a material of the fiduciary document type. The term "fiduciary document" denotes here papers such as papers for banknotes, checks, values, stamps, identity papers, account books, and also credit cards, payment cards and similar documents that it is important to authenticate.

The phosphor according to the invention may be introduced on or into the fiduciary document to be marked. For example, it may be incorporated into or on the paper, or into or on the plastics with which the document to be identified may be coated.

The quantity of phosphor to be used may vary over a very wide range. To give an example, this quantity, expressed as weight of phosphor relative to the weight of marked paper, may be between $10^{-6}$% and 15%, more particularly between 0.01% and 5% and even more particularly between 0.5% and 3%.

The invention may also apply the marking of works of art, luxury articles and industrial products.

Finally, the invention relates to a method of authenticating a material. This method applies of course to the verification or authentication of materials of the type of those that have just been described, and it applies the principle of the invention, that is to say the properties of one or more phosphors producing emissions at different wavelengths and with different decay times. The method consequently consists in subjecting the material to be verified, which may therefore be a material as described above or obtained by the marking method of the invention, or else a material assumed to be obtained by this method, the authenticity of which is thus desired to verify, to an excitation of the type described above and in observing whether or not this material produces at least two light emissions, the respective emission wavelengths and decay times of which are different.

The verification or authentication method of the invention may be implemented using any type of suitable detector. For example, it is possible to use a detector provided with one or more sources which emit, in the form of flashes, the suitable type or types of radiation toward the material, this or these sources possibly being, for example, a lamp in the case of ultraviolet radiation and a lamp or photodiode in the case of infrared radiation. The detector further includes means for measuring an emission signal, for example a spectrometer, these means operating over time periods in order to be able to detect emissions delayed over time. Visible light may for example be detected by means of photodetectors, especially photodiodes or photomultipliers, which will be suitable for detecting the wavelengths in question.

It should also be noted that, in the case of certain phosphors, the verification or authentication may be implemented with the naked eye. This is the embodiment already described above, in which one or more phosphors emitting in the visible and emitting in different colors are used. In this particular case, the method according to the invention for authenticating a material may be implemented in particular by applying a relative movement between the material and the excitation source. Thus, the material may be scanned with a ray from an excitation source, which in this case reveals, on the correctly marked material, a background color streaked with a different color. This effect corresponds to the rapid extinction of the emission with the shortest decay time and to the persistence of the emission with the longest decay time. The presence or absence of this visual effect is thus used to authenticate the material with the naked eye. It should be indicated that the relative speed between the material and the excitation source must be high enough to obtain the visual effect described above, for example it must be at least 20 cm/s. The method may be implemented extremely simply, for example using an LED light pen emitting light with a wavelength between 350 nm and 420 nm. The LED light pen is made to emit and the material to be verified is scanned with the LED light pen, and therefore with the light ray that emanates therefrom. The presence or absence of the trace effect described above allows the material to be authenticated or, on the contrary, proves that it is not a marked material.

Detection with the naked eye may also be accomplished by subjecting the material to the excitation and then turning the excitation source off. In this case, what is looked for is whether light persists with a different color from that observed when the excitation source is operating.

Examples will now be given.

EXAMPLE 1

This example illustrates the marking of a polymer film according to the method of the invention.

a) Preparation of the Phosphor

A phosphor compound having the composition $Ba_3MgSi_2O_8:2\%$ $Eu^{2+},+5\%$ $Mn^{2+}$ and corresponding to the formula $Ba_{2.94}Eu_{0.06}Mg_{0.95}Mn_{0.05}Si_2O_8$ (the percentages indicated for the dopant ions correspond to the molar degrees of substitution of $Eu^{2+}$ and $Mn^{2+}$ ions with $Ba^{2+}$ and $Mg^{2+}$ ions respectively) was prepared using solid-state processing, by mixing the oxides $BaCO_3$, $Eu_2O_3$, $(MgCO_3)_4Mg(OH)_2 \cdot 5H_2O$, $MnCO_3$ and $SiO_2$ in stoichiometric proportions. Added to the mixture as flux was 0.4 mol of $NH_4Cl$.

| Starting products | Quantities used |
| --- | --- |
| $BaCO_3$ | 1.8629 g |
| $Eu_2O_3$ | 0.0339 g |
| $(MgCO_3)_4Mg(OH)_2 \cdot 5H_2O$ | 0.2963 g |
| $MnCO_3$ | 0.0185 g |
| $SiO_2$ | 0.3858 g |
| $NH_4Cl$ | 0.0687 g |

These starting products were uniformly mixed by milling and the mixture, placed in an alumina crucible, was put into a furnace where it underwent two heat treatments. A first heat treatment was carried out at 600° C. for 4 hours in air. The mixture, which was gray in color, was then milled before being put back into the furnace in an alumina crucible. After purging the furnace for 4 hours with a 10% $H_2/Ar$ gas mixture, the mixture was heated for 4 hours at 1200° C. in this reducing atmosphere. The rate of temperature rise and fall employed was 360° C./h.

b) Preparation of the Polymer Film

The product obtained above was heated in an oven for 12 h at 90° C. It was then mixed in a tube mixer for 10 minutes with LDPE (low-density polyethylene), namely Lacqtène 1020FN24, PEG 400 (a bonding agent) and an antioxidant, namely Irganox B225. The formulations employed were the following:

| | |
| --- | --- |
| Lacqtène 1020FN24 LDPE | 1495.5 g |
| Phosphor | 1.5 g |
| Irganox B225 (0.1%) | 1.5 g |
| PEG 400 (0.1%) | 1.5 g |
| Total | 1500 g |

The processing was carried out on a ZSK30 twin-screw extruder to which a sheet die of 30 cm width and of adjustable aperture was fitted, and also a cast film machine for stretching the film output by the extruder so as to reduce it to a thickness of 100 μm.

The temperature in the extruder and in the film die was 180° C. The temperature at the inlet of the cast film machine was 70° C. The other conditions were the following:

| screw speed | hopper feed rate | roll speed | twin-screw torque | die outlet pressure |
| --- | --- | --- | --- | --- |
| 96 rpm | 4 kg/h | 2.3 m/min | 6.3 A | 49 bar | c) Detection

The possible detection methods were the following.

Firstly, the film was subjected to a continuous illumination with a wavelength of 370 nm, i.e. the emission of purple light. The emission spectrum for this excitation wavelength is given in the appended FIGURE. This shows that the compound emits, in response, in the red (the peak at about 625 nm) and also in the blue (the peak at around 440 nm).

Secondly, a flash at 370 nm was emitted then after 1 ms, the spectrum was taken. Only the presence of the peak corresponding to the red was then observed. The red emission is due to the manganese and this corresponds to a decay time $\tau_1$ of 35 ms, while the blue emission is due to the europium and corresponds to a decay time $\tau_2$ of 339 ns.

Detection was also possible with the naked eye. To do this, the surface of the film was scanned with a source (LED light pen) emitting a light ray with a wavelength of 370 nm. The film emitted light of purple color and during the scan a red streak appeared. This phenomenon is due to the rapid extinction of the blue emission and to the persistence of the red emission.

EXAMPLE 2

This example illustrates the marking of the same polymer film as in example 1, but with another phosphor.

a) Preparation of the Phosphor

A phosphor compound corresponding to the formula $Ba_{0.9}Eu_{0.1}Mg_{0.95}Mn_{0.05}Al_{10}O_{17}$ was prepared using the same solid-state method as in example 1 and using the same starting products as in this example in the case of barium, europium, magnesium and manganese. An alumina was also used as aluminum source.

| Starting products | Quantities used |
|---|---|
| $BaCO_3$ | 1.665 g |
| $Eu_2O_3$ | 0.125 g |
| $(MgCO_3)_4Mg(OH)_2 \cdot 5H_2O$ | 0.345 g |
| $MnCO_3$ | 0.041 g |
| $Al_2O_3$ | 3.608 g |

The procedure was as in example 1, but using 1 wt % $MgF_2$ as flux and the second heat treatment being carried out at 1400° C.

b) Preparation of the Polymer Film

The procedure was as in example 1, incorporating the product prepared in the manner described above into the LDPE.

c) Detection

When the film was subjected to continuous illumination with a wavelength of 370 nm, it emitted blue-green light. The emission spectrum had a peak at 450 nm (blue light) and a peak at 514 nm (green light).

Detection with the naked eye was implemented by scanning the surface of the film with a source (LED light pen) emitting a light ray with a wavelength of 370 nm. The film emitted blue-green light and during the scan a green streak appeared. This phenomenon is due to the rapid extinction of the blue emission and the persistence of the green emission.

Examples 3 to 5 that follow relate to marking in paper according to the method of the invention. The phosphor used was that of example 1.

EXAMPLE 3

This example relates to a paper formulation based on wood fiber (mechanical or thermomechanical pulp). A coating formulation of the composition below (in parts by weight) was thus prepared:

| | |
|---|---|
| $CaCO_3$ | 50 |
| Kaolin | 50 |
| Rhodopas ® SBO 24 (styrene/butadiene latex) | 11 |
| CMC FF5 (carboxymethylcellulose) | 1.5 |
| Rhodoviol 4/20 ® (polyvinyl alcohol) | 0.3 |
| Phosphor | 10 |

The solids content was 50% and the Brookfield viscosity, measured at 100 rpm, was from 800 to 1000 cps.

The formulation was deposited by a Meyer bar (threaded rod) in an amount of 8 g/m² on a 50 g/m² LWC paper medium and then dried.

For the detection, the surface of the paper thus obtained was scanned with an LED light pen emitting a light ray with a wavelength of 370 nm. The paper emitted light of purple color at the point of contact between the ray and the paper, and a red streak appeared along the path of movement of this point during the scanning with the LED light pen at the rate of 25 cm/s.

EXAMPLE 4

This example relates to a wood-free, doubly coated paper formulation based on a chemical pulp.

Thus, a first coating formulation, for the surface layer, with the composition below (in parts by weight) was prepared:

| | |
|---|---|
| $CaCO_3$ | 80 |
| Kaolin | 20 |
| Rhodopas ® SBO 24 | 10 |
| CMC FF5 | 0.5 |
| Rhodoviol 4/20 ® | 0.5 |
| Phosphor | 10 |

The solids content was 68% and the Brookfield viscosity measured at 50 rpm was 1000 cps.

The formulation was deposited by a Meyer bar in an amount of 10 g/m² on a paper medium.

A second coating formulation, for the prelayer, with the composition below (in parts by weight) was also prepared:

| | |
|---|---|
| $CaCO_3$ | 100 |
| Starch | 6 |
| Rhodopas ® SBO 24 | 6 |
| Rhodoviol 4/20 ® | 0.5 |
| Phosphor | 10 |

The solids content was 55% and the Brookfield viscosity measured at 50 rpm was 500 cps.

The formulation was deposited by a Meyer bar in an amount of 10 g/m² on the paper medium.

The detection was carried out in the same manner as that described in example 3 with the same LED light pen, and in addition to the purple color, the appearance of a red streak was also observed during the scan.

EXAMPLE 5

This example relates to a sized paper formulation.

A coating formulation with the composition below (in parts by weight) was thus prepared:

| | |
|---|---|
| Starch | 25 |
| Phosphor | 3 |

The solids content was 15%.

The formulation was deposited by a Meyer bar in an amount of 20 g/m² on the paper medium.

The detection was carried out in the same manner as that described in example 3 with the same LED light pen and, here again, in addition to the purple color, the appearance of a red streak was observed during the scan.

EXAMPLE 6

This example illustrates the use of two phosphors according to the embodiment described above in which a phosphor A of the type of the first embodiment is used with another phosphor B of the type of the second embodiment. Phosphor A was that of example 1 while phosphor B was $Ba_2SiO_4$:Eu ($Ba_{1.98}Eu_{0.02}SiO_4$) which emitted in the green at 510 nm. The proportion by weight of the two phosphors was 50/50.

The two phosphors were incorporated into a paper formulation of the same type as that of example 3, and with the coating formulation below:

| | |
|---|---|
| CaCO₃ | 50 |
| Kaolin | 50 |
| Rhodopas ® SBO 24 (styrene/butadiene latex) | 11 |
| CMC FF5 (carboxymethylcellulose) | 1.5 |
| Rhodoviol 4/20 ® (polyvinyl alcohol) | 0.3 |
| Phosphors A + B | 5 |

The detection was carried out in the same manner as that described in example 3 with the same LED light pen. The paper emits white light at the point of contact between the ray and the paper, with the appearance of a front of blue color with a red streak along the path of movement of this point during the scan with the LED light pen. This is therefore a three-color marking system.

EXAMPLE 7

This example illustrates the use of two phosphors according to the embodiment of the type of example 6 and also a three-color marking system. The same paper formulation and the same coating formulation as in example 6 were used. Also used was a phosphor mixture of phosphor B of example 6 and a phosphor A' of formula $Ba_{2.7}Eu_{0.3}Mg_{0.9}Mn_{0.1}Si_2O_8$ in a 50/50 weight ratio. This phosphor A' was obtained in the same manner as that described in example 1, only the stoichiometric proportions being changed.

The detection was carried out in the same manner as that described in example 3 with the same LED light pen. The paper emitted white light at the point of contact between the ray and the paper with the appearance of a front of green color with a red streak in the path of movement of this point during the scan with the LED light pen.

The invention claimed is:

1. A method of marking a material, comprising the step of incorporating into the material:
    either at least one phosphor capable of producing, after excitation, two light emissions, the respective wavelengths and the decay times of the emissions being different; or
    several phosphors each capable of producing, after excitation, a light emission, the wavelength and the decay time of the emission being different than the wavelength and the decay time of the emission of the other phosphor(s) wherein the at least one phosphor or at least one of the several phosphors is of formula (6), namely $Ca_5(PO_4)_3X$:Eu,Mn in which the calcium is optionally substituted with at least one alkaline-earth metal and X is a halogen.

2. A method of marking a material, comprising the step of incorporating into the material:
    either at least one phosphor capable of producing, after excitation, two light emissions, the respective wavelengths and the decay times of the emissions being different; or
    several phosphors each capable of producing, after excitation, a light emission, the wavelength and the decay time of the emission being different than the wavelength and the decay time of the emission of the other phosphor(s), wherein the at least one phosphor or at least one of the several phosphors is of formula (7), namely $MGa_2S_4$:Eu,Mn in which M denotes at least one alkaline-earth metal.

3. A method of marking a material, comprising the step of incorporating into the material at least two phosphors, wherein the first phosphor is capable of producing, after excitation, two light emissions, where the respective emission wavelengths and decay times are different, and a second phosphor capable, after excitation, of emitting light, where the wavelength and the decay time of the emission from the second phosphor is different than the wavelengths and decay times of the emissions of the first phosphor.

4. The method as claimed claim 3, wherein phosphors emit radiation in the visible spectrum.

5. The method as claimed in claim 3, wherein the material is a paper, a board, a paint, a textile, an ink, a glass, a fiduciary document, a macromolecular material or a banknote.

6. The method as claimed in claim 3, wherein the decay times of the emissions are in a ratio of at most $10^{-5}$.

7. The method as claimed in claim 3, wherein the difference between the emitted wavelengths is at least 100 nm.

* * * * *